INVENTORS
HAROLD V. CLARK
ELWIN MACRAE
BY Flehr & Swain
ATTORNEYS

RECORDING AND REPRODUCING SYSTEM AND METHOD

Filed Aug. 11, 1959 3 Sheets-Sheet 2

INVENTOR.
HAROLD V. CLARK
ELWIN MACRAE
BY Flehr & Swain
ATTORNEYS

RECORDING AND REPRODUCING SYSTEM AND METHOD

INVENTOR.
HAROLD V. CLARK
ELWIN MACRAE
BY
Flehr & Swain
ATTORNEYS

United States Patent Office 3,031,535

Patented Apr. 24, 1962

3,031,535

RECORDING AND REPRODUCING SYSTEM AND METHOD

Harold V. Clark, Menlo Park, and Elwin MacRae, Los Altos, Calif., assignors to Ampex Corporation, Redwood City, Calif., a corporation of California Filed Aug. 11, 1959, Ser. No. 833,074
7 Claims. (Cl. 179—100.2)

This invention relates generally to a recording and reproducing system and method and more particularly to a system in which during reproduction the capstan is driven from a capstan servo which is controlled from a control signal recorded during the recording process and to a capstan servo which operates in the absence of control signal. The invention relates further to a system in which the recording and reproducing capstan servo can be controlled for synchronizing two or more recorders.

In Patent No. 2,866,012, there is described a magnetic recording and/or reproducing system making use of a rotary transducing head assembly. The transducing assembly includes a head drum which carries a plurality of equally spaced transducing units which cooperate with a relatively wide magnetic tape which is cupped by a concave guide as it is driven lengthwise past the transducing assembly.

The transducing units form longitudinally spaced sucesive transverse record tracks. The tracks include signal information which is duplicated at the end of one track and the beginning of the next. The duplication is employed in the reproducing system to switch from the output of one transducer to another without introducing distortion in the reproduced signal.

The side margins of the tape are erased and serve to receive longitudinal sound and control tracks. During recording, a control signal is derived which has a frequency dependent upon the speed of rotation of the rotary head assembly. This signal is applied to an amplifier which drives the capstan motor and is also applied to a record head which serves to form a longitudinal control track on one side margin of the tape. During reproduction, the control track is reproduced and applied to a servo system which controls the relative speed of the capstan and transducing head assembly. The magnetic heads are caused to track in the identical manner as they did during recording.

In certain instances such as just preceding a recording or between two recordings, there may be a track portion which does not carry control information. When such a condition occurs, the control track servo system has a tendency to shift to an operating condition that may be termed "free running" or "drifting" and requires a long recovery time after the return of control information. The capstan may drive the magnetic tape longitudinally at a varying rate which causes distortion in the output signal or may result in complete loss of signal, due to the fact the rotating transducing units are not scanning the transverse tracks because of the lack of synchronism.

It is, therefore, an object of the present invention to provide a recording system of the above character in which loss of the control track does not cause hunting or other undesirable conditions of the servo system.

It is a further object of the present invention to provide a recording and reproducing system in which loss of control information causes the servo system to operate at a predetermined drive frequency.

It is still a further object of the present invention to provide a capstan servo system which includes means for synchronizing one or more machines.

These and other objects of the invention will become more apparent from the following description when taken in conjunction with the accompanying drawing.

Referring to the drawing.

Figure 1:
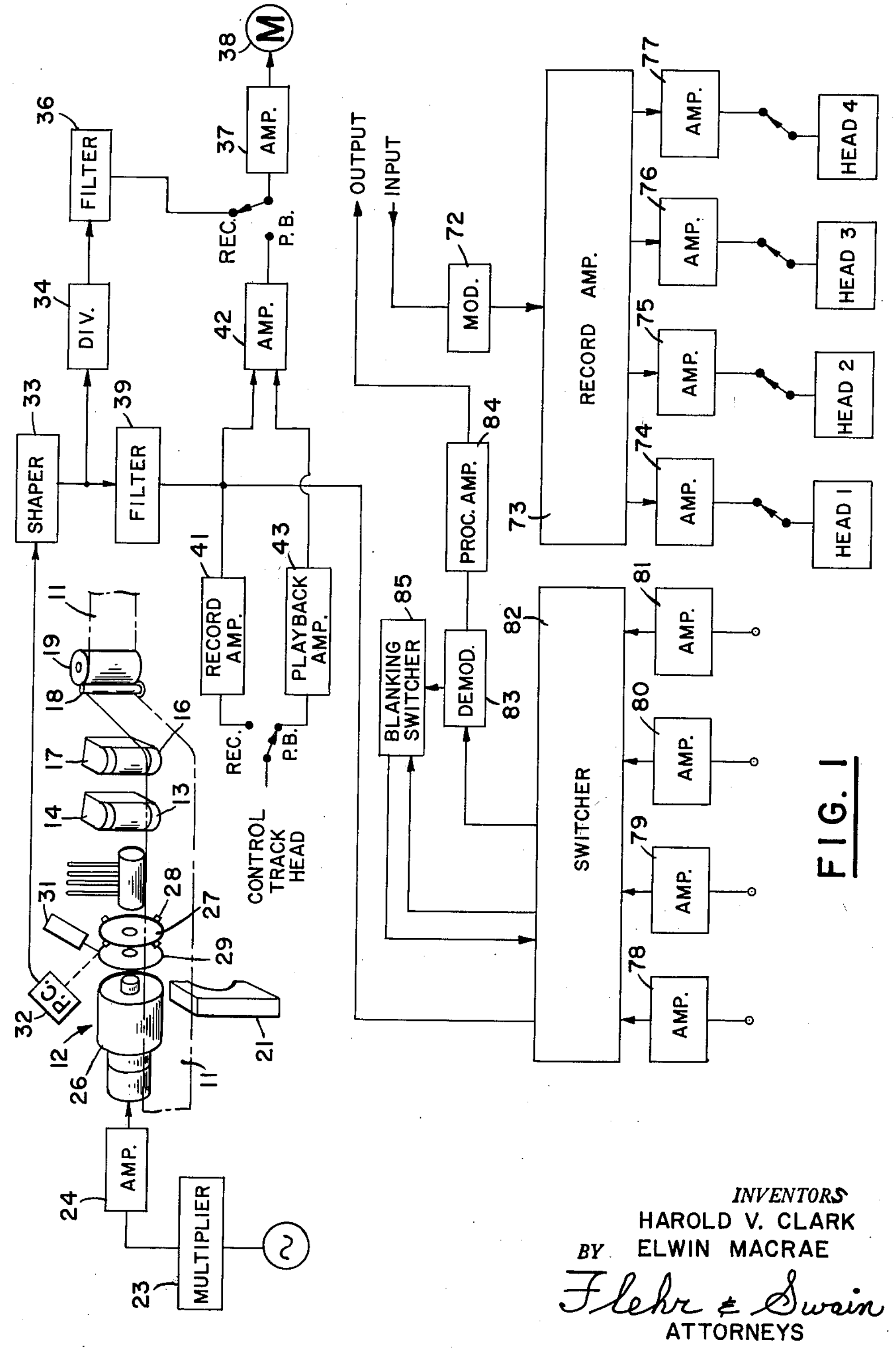
FIGURE 1 is a schematic block diagram of a recording system incorporating the present invention.

Referring to FIGURE 1, a system incorporating the present invention is illustrated. The transport mechansm for the magnetic tape 11 is similar to that found in many high quality professional recorders and, therefore, is not shown in detail. The tape is supplied from a reel on the left (not shown), past an idler (not shown), past the rotating head assembly designated generally by the reference numeral 12, then passes erase heads 13 and 14 which clear a stripe at the top and bottom of the tape for recording audio and control information respectively, then past recording and playback heads 16 and 17 which record the audio and control track information in the record mode and reproduce the information in the reproduce mode. One of these heads records the audio signal longitudinally on a side margin of the tape; the other in the same way records a longitudinal control track on the other side margin. The tape next passes between a drive capstan 18 and its idler 19, round a take-up idler (not shown) and onto a take-up reel (not shown). The erase, audio and control track magnetic heads remain stationary during the recording and reproducing process.

The tape is guided past the rotating transducing head assembly and a concave guide 21 cups the tape around the disc. The relation of the tape to the rotating heads is necessarily intimate, and good head contact at very nearly constant pressure is required. This is accomplished by forming a guide with accurate tolerances, providing a system for holding the tape in intimate contact with the guide, and providing an automatic compensation system.

The drive power may be applied through a multiplier 23, then to a three phase power amplifier 24 which drives the synchronous motor 26 which carries the revolving disc 27 having a plurality of spaced transducing units or magnetic heads 28. The motor shaft may also carry a disc 29 which is coated half black and half white. A light source 31 is focused onto the coated portion of the disc 29 and the reflected light is observed by means of a light sensitive device, for example photocell 32.

The output of the photocell is approximately a squarewave which has a frequency dependent upon the speed of rotation of the magnetic head assembly. This signal is applied to a shaper 33, thence through a divider 34 and filter 36 to a power amplifier 37 which drives the capstan motor 38. The whole chain is an electrical analog to mechanical gear train, coupling the rotation of the capstan firmly to the actual rotation of the head disc. The power supply to the capstan is controlled by the actual motion of the revolving head disc, enslaving the capstan to the head disc. Thus, during the recording process, the tape is moved a precise longitudinal amount during each complete revolution of the head disc, which has, during this period, recorded four lateral tracks, one for each head on the disc, each track being separated from the next by a predetermined center-to-center spacing.

The output of the shaper 33 is also applied through a filter 39 to a recording amplifier 41 which energizes the control track head. A control signal directly related to the speed of the capstan and rotating head assembly is recorded longitudinally on one side margin of the tape. This control track becomes the magnetic equivalent of the sprocket holes of a sprocketed film machine. This signal is reproduced and employed during reproduction to control the relative position of the head disc and capstan shaft.

When the recorded tape is played back, the drive power frequency is again multiplied, amplified and employed to drive the head disc motor, driving at a rate which is approximately correct for the purposes of tracing the previously recorded magnetic tracks.

Again, the photoelectric cell produces a signal having a frequency corresponding to the rotational frequency of the head disc. This signal is shaped and passed through filter 39. The filtered signal is applied to amplifier 42 which includes a phase comparator. This amplifier also receives the reproduced control track which is amplified by amplifier 43. The phase of the two signals is compared to derive a signal which is a function of the phase difference between the two. This is applied to the grid of a reactance tube which is connected in the frequency determining circuit of a Wien bridge oscillator. The oscillator output is applied to amplifier 37 to drive the capstan motor 38.

Figure 2:
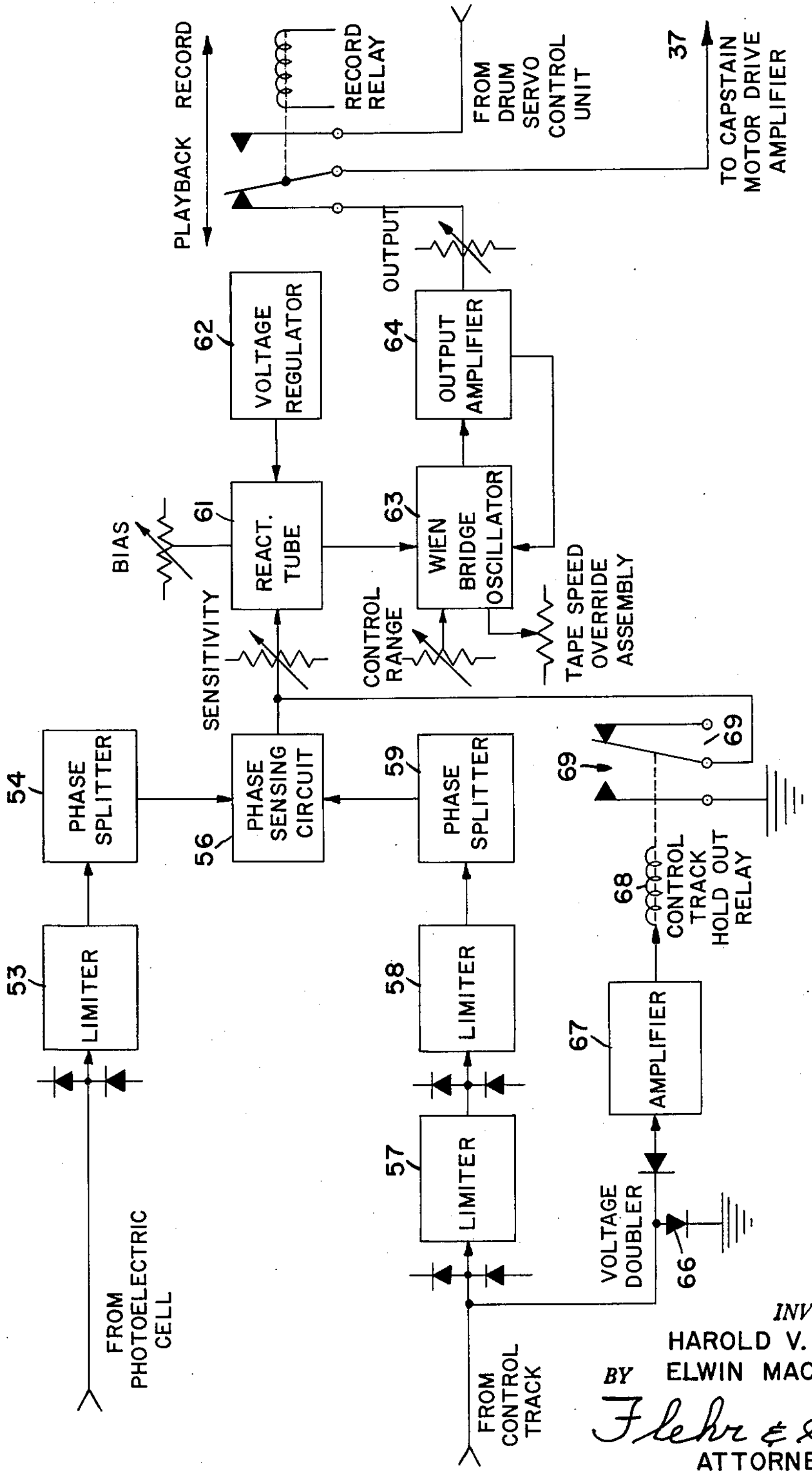
FIGURE 2 is a schematic block diagram of a servo system in accordance with the present invention.

Referring to FIGURE 2, a complete block diagram of the amplifier 42 is shown. The signal from the photoelectric cell is applied to a limiter 53, through phase splitter 54, to the phase sensing circuit 56. The signal from the control track is likewise applied to a limiter 57, thence to second stage of limiting 58, through phase splitter 59, to the phase sensing circuit 56 which provides an output signal to the reactance tube 61. A voltage regulator 62 provides regulated voltage to the reactance tube 61. The reactance tube 61 is connected to control the frequency of oscillation of the Wien bridge oscillator 63. The output of the oscillator 63 is amplified by amplifier 64 and applied to the capstan motor drive amplifier 37.

The oscillator functions normally at a predetermined center frequency. The frequency is slightly modified up or down by the correction signal from the phase comparator.

The effect is to cause the capstan to revolve during replay in exactly the same relationship to the revolving disc within narrow limits as it did during the recording process. Once the disc is adjusted on the center of the track at the beginning of replay, the servo system holds the relationship constant, and the revolving heads will indefinitely trace accurately the longitudinally spaced recorded tracks. The signal from the control track is also applied to a voltage doubler circuit designated generally by the reference numeral 66, thence to an amplifier 67, and to the coils of a hold-out relay 68. When a signal is available from the control track, the amplifier 67 is biased whereby the relay contacts 69 are in the position shown whereby the reactance tube 61 is connected to receive the output of the phase sensing circuit. However, in the absence of control signal, the amplier 67 bias is reduced and the amplifier 67 energizes the coils to move the contacts and ground the input of the reactance tube. The oscillator then oscillates at its center frequency.

Thus, it is seen that the system automatically serves to lock in the oscillator in the event of tape drop-out and loss of control track signal. This prevents excursions in the oscillating frequency of the oscillator and consequent hunting and/or oscillating of the capstan and loss of tracking during reproduction.

In the lower part of FIGURE 1, the electronic circuitry employed to record and reproduce signals is shown. The input signal is applied to a modulator 72 which forms a frequency modulated signal which is amplified by a record amplifier 73 and applied to the record amplifiers 74–77 and thence to the record heads 1–4, respectively. The heads are fed simultaneously and as the heads come in contact with the tape, they form a record track. Two heads are in contact with the tape at the end of one track portion and the beginning of the next to form an overlap.

During reproduction, the heads are connected to the preamplifiers 78–81 and thence to an electronic switcher 82. The switcher 82 serves to switch from one head to another to form a composite output signal which is then demodulated by a demodulator 83. When reproducing television signals, a processing amplifier 84 serves, through conventional video technique, to strip off synchronizing information, reconstitute the information and add it back to the video signal. A blanking switcher 85 acts in conjunction with the switcher 82 to switch during the blanking portion of the television signal to thereby reduce distortion.

Figure 3:
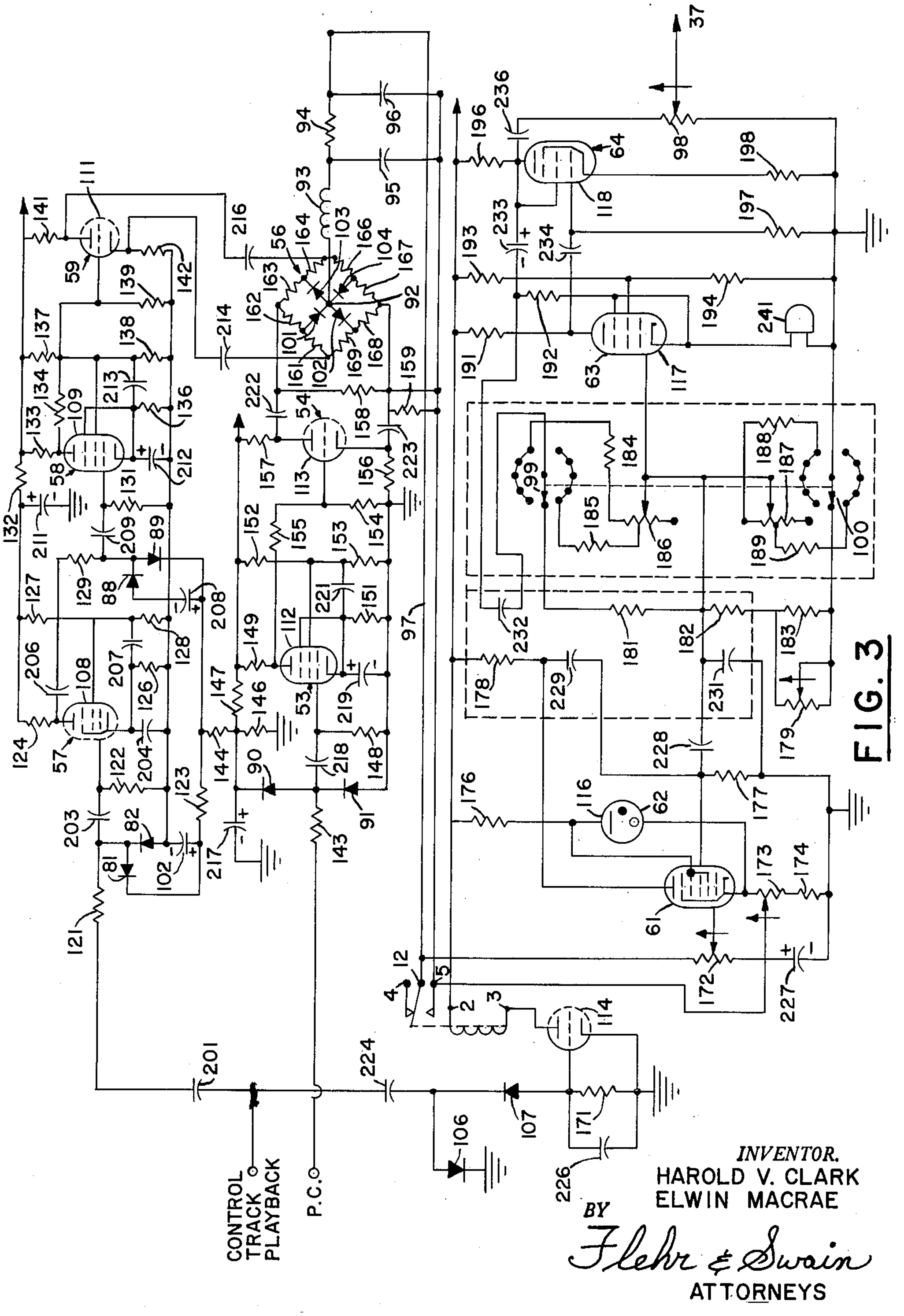
FIGURE 3 is a detailed circuit diagram of the servo system shown in FIGURE 2.

Referring to FIGURE 3, a detailed circuit diagram of the servo control system shown in FIGURE 2 is shown. The diodes 81 and 82 are connected to clip the input signal. The signal is applied to the limiting amplifier stage 57. The output of stage 57 is clipped by diodes 88 and 89 and applied to another stage 58 of amplification and limiting. The limited output is applied to the phase splitter 59. Signals of opposite phase are applied to one pair of opposite legs of the bridge detecting circuit 56.

The signal from the photoelectric cell is clipped by diodes 90 and 91 and applied to a limiting amplifier stage 53. The limited output of stage 53 is applied to a phase splitter 54 and thence to the other pair of opposite legs of the bridge detecting circuit 56.

An output will appear across the common terminal 92 of the bridge circuit when there is a difference in phase between the applied signals. This output is filtered by the filter network including the inductance 93, resistance 94, and capacitors 95 and 96. The filtered output is applied along the line 97 to the reactance tube 61. Regulated voltage is applied to the reactance tube by the circuit 62. The tube 61 is connected in the frequency determining circuit of the Wien bridge oscillator 63. The output of the oscillator is amplified by amplifier 64, appears across the load resistor 98 and is applied to the amplifier 37.

Another of the novel features of the circuit is the incorporation of an over-ride assembly which includes the potentiometers 90 and 100. With the slider in the position shown, the frequency determining circuit is connected directly to the reactance tube and the frequency of the oscillator 63 is controlled by the reactance tube 61. However, when the taps are moved, for example, upwardly, the reactance tube is disconnected and the circuit is altered in such a way as to change the frequency of operation to speed up the system. Further rotation will further increase the frequency. On the other hand, if the taps are moved downwardly, the frequency of oscillation will be lowered thereby lowering the output frequency and the speed of the capstan. Thus, the actual rotating speed of the capstan may be speeded up or slowed down by manually turning the potentiometers 99 and 100. A feature of the potentiometers is that they include a dwell position which may be detented. An operator can easily readjust the system to operate in its normal condition after having synchronized the plurality of machines associated with the system.

A circuit in accordance with the foregoing was constructed in which the components and voltages were as follows:

Voltage:

| | |
|---|---|
| B+ | 250 volt. |

Diodes:

| | | | |
|---|---|---|---|
| 86 | DR 497. | 101 | DR 497. |
| 87 | DR 497. | 102 | DR 497. |
| 88 | DR 497. | 103 | DR 497. |
| 89 | DR 497. | 104 | DR 497. |
| 90 | DR 497. | 106 | DR 497. |
| 91 | DR 497. | 107 | DR 497. |

Vacuum tubes:

| | | | |
|---|---|---|---|
| 61 | 5750. | 113 | ½5963. |
| 108 | ½6AW8A. | 114 | ½6AW8. |
| 109 | 6AU6. | 116 | OB2. |
| 111 | ½5963. | 117 | 6AU6. |
| 112 | 6AU6. | 118 | 6AQ5. |

Resistors: (ohms):

| | | | |
|---|---|---|---|
| 94 | 470. | 159 | 100K. |
| 98 | 250K. | 161 | 10K. |
| 121 | 47K. | 162 | 10K. |
| 122 | 1 meg. | 163 | 10K. |
| 123 | 100. | 164 | 10K. |
| 124 | 3900. | 166 | 10K. |
| 126 | 180. | 167 | 10K. |
| 127 | 10K. | 168 | 10K. |
| 128 | 47K. | 169 | 10K. |
| 129 | 470K. | 171 | 1 meg. |
| 131 | 1 meg. | 172 | 50K. |
| 132 | 1800. | 173 | 500. |
| 133 | 33K. | 174 | 220. |
| 134 | 560K. | 176 | 7000. |
| 136 | 150. | 177 | 4.7 meg. |
| 137 | 47K. | 178 | 22K. |
| 138 | 47K. | 179 | 100K. |
| 139 | 390K. | 181 | 237K. |
| 141 | 10K. | 182 | 220K. |
| 142 | 10K. | 183 | 62K. |
| 143 | 47K. | 184 | 180K. |
| 144 | 100. | 185 | 240K. |
| 146 | 100. | 186 | 100K. |
| 147 | 25K. | 187 | 100K. |
| 148 | 1 meg. | 188 | 180K. |
| 149 | 33K. | 189 | 240K. |
| 151 | 150. | 191 | 47K. |
| 152 | 47K. | 192 | 4300. |
| 153 | 47K. | 193 | 68K. |
| 154 | 390K. | 194 | 47K. |
| 155 | 560K. | 196 | 7500. |
| 156 | 10K. | 197 | 470K. |
| 157 | 10K. | 198 | 470. |
| 158 | 100K. | | |

Capacitors (microfarads):

| | | | |
|---|---|---|---|
| 95 | 5 | 218 | 0.1 |
| 96 | 55 | 219 | 50 |
| 201 | 0.1 | 221 | 0.22 |
| 202 | 100 | 222 | 1.0 |
| 203 | 0.1 | 223 | 1.0 |
| 204 | 50 | 224 | .047 |
| 206 | 0.1 | 226 | .047 |
| 207 | 0.22 | 227 | 100 |
| 208 | 100 | 228 | 0.1 |
| 209 | 0.1 | 229 | 0.001 |
| 211 | 4 | 231 | 0.01 |
| 212 | 50 | 232 | 0.01 |
| 213 | 0.22 | 233 | 4 |
| 214 | 1.0 | 234 | 0.1 |
| 216 | 1.0 | 236 | 0.1 |
| 217 | 100 | | |

The circuit in accordance with the foregoing operated at a frequency of 60 cycles, the frequency being altered up and down by the error signal applied to the reactance tube. The capstan servo lock-out served to lock in the system to operate at the center frequency of the oscillator 63 when there was absence of a control signal. The tape speed over-ride assembly was adjustable to change the frequency ±20% in a linear manner.

We claim:

1. A reproducing system of the type in which a record medium having recorded thereon signal information and a control signal is driven by a drive means past a transducing means to reproduce the recorded signal information and control track including a motive means for driving the drive means, means for supplying power to said motive means to drive the medium at a predetermined velocity, means for driving the medium above or below the predetermined velocity in response to the control signal, and means for controlling the power supply means in the absence of reproduced control signal whereby the motive means continues to drive the medium at the predetermined velocity.

2. A reproducing system of the type in which a record medium having recorded thereon signal information and a control signal is driven by a capstan in cooperative relationship with transducing means to reproduce the recorded signal information and control track including a capstan motor for driving the capstan, means for supplying power having a predetermined frequency to said motor whereby it operates at a predetermined velocity, means for controlling the power frequency so that the capstan may be driven above or below the nominal velocity in response to the control signal, and means for controlling the power means to supply power at a predetermined frequency in the absence of reproduced control signal.

3. A reproducing system for recordings formed by a rotary transducing head assembly acting in cooperation with an elongated recording medium driven by a capstan drive past the transducing head assembly and having recorded on a longitudinal control track portion a signal having a frequency dependent upon the speed of rotation of the head assembly comprising a rotary transducing head assembly, a capstan serving to drive the elongated recording medium past said rotary transducing head assembly, a motor serving to drive said capstan, an oscillator serving to supply a signal of predetermined frequency to said capstan motor, means serving to receive the reproduced control signal, means for deriving a signal corresponding to the speed of rotation of the rotary transducing head assembly, means for comparing the frequency of the reproduced control signal and derived signal and forming an error signal, means serving to control the frequency of operation of said oscillator in response to the error signal whereby the frequency is varied from the predetermined frequency and frequency determining means to cause the oscillator to oscillate at a predetermined frequency in the absence of reproduced control signal.

4. A reproducing system for recordings formed by a rotary transducing head assembly acting in cooperation with an elongated recording medium driven by a capstan drive past the transducing head assembly and having recorded on a longitudinal control track portion a signal having a frequency dependent upon the speed of rotation of the head assembly comprising a rotary transducing head assembly, a capstan serving to drive the elongated recording medium past said rotary transducing head assembly, a motor serving to drive said capstan, an oscillator serving to supply a signal of predetermined frequency to said capstan motor, means serving to receive the reproduced control signal, means for deriving a signal corresponding to the speed of rotation of the rotary transducing head assembly, means for comparing the frequency of the reproduced control signal and derived signal and forming an error signal, means serving to control the frequency of operation of said oscillator in response to the error signal whereby the frequency is varied from the predetermined frequency, and means connected in a frequency determining circuit of said oscillator for adjusting the frequency of operation relative to said predetermined frequency, said frequency adjusting means serving to disconnect the frequency determining means so that the oscillator causes the capstan to operate above or below the predetermined frequency thereby synchronizing the system with associated machines.

5. A reproducing system for recordings formed by a rotary transducing head assembly acting in cooperation with an elongated recording medium driven by a capstan drive past the transducing head assembly and having recorded on a longitudinal control track portion a signal having a frequency dependent upon the speed of rotation of the head assembly comprising a rotary transducing head assembly, a capstan serving to drive the elongated recording medium past said rotary transducing head assembly, a motor serving to drive said capstan, an oscillator serving to supply a signal of predetermined frequency to said capstan motor, means serving to receive the reproduced control signal, means for deriving a signal corresponding to the speed of rotation of the rotary transducing head assembly, means for comparing the frequency of the reproduced control signal and derived signal and forming an error signal, means for controlling the frequency of operation of said oscillator in response to the error signal whereby the frequency is varied from the predetermined frequency, means connected in a frequency determining circuit of said oscillator for adjusting the frequency of operation relative to said predetermined frequency, said frequency adjusting means serving to disconnect the frequency determining means so that the oscillator causes the capstan to operate above or below the predetermined frequency thereby synchronizing the system with associated machines, and relay circuit means for causing the oscillator to oscillate at its center frequency in the absence of reproduced control signal.

6. A system for reproducing a recorded signal from a magnetic medium having a rotating capstan and a rotating head assembly comprising: means for deriving a control signal from said medium for controlling the speed of rotation of said capstan; a reactance tube coupled to the output of said control signal deriving means; a relay means coupled between said control signal deriving means and said reactance tube for activating said tube in the presence of said derived control signal and for inactivating said tube in the absence of said control signal; phase sensing means for comparing said control signal when present with a reference signal representing the speed of rotation of said head assembly to provide an error signal, said phase sensing means being coupled to the input of said reactance tube to vary the reactance characteristics of said tube in accordance with said error signal; and an oscillator for controlling the speed of rotation of said capstan coupled to the output of said reactance tube, said oscillator oscillating at a frequency in accordance with the reactance of said reactance tube when activated, and oscillating at a center frequency when said reactance tube is inactivated.

7. A system for reproducing a recorded signal from a magnetic medium having a rotating capstan and a rotating head assembly comprising: means for deriving a control signal from said medium for controlling the speed of rotation of said capstan; means for deriving a signal from said rotating head assembly representing the speed of rotation of said head assembly; a phase sensing means coupled to the output of both said signal deriving means for developing an error signal; an oscillator coupled to the output of said phase sensing means for varying the speed of rotation of said capstan; a reactance tube coupled between said phase comparing means and said oscillator for varying the frequency of oscillation of said oscillator in accordance with said developed error signal; and a relay connected between said means for deriving a control signal and said reactance tube for activating said tube in the presence of a control signal and for inactivating said tube in the absence of a control signal, said oscillator oscillating at a center frequency when said reactance tube is inactivated.

References Cited in the file of this patent

UNITED STATES PATENTS

| | | |
|---|---|---|
| 2,831,106 | Clark | Apr. 15, 1958 |
| 2,854,526 | Morgan | Sept. 30, 1958 |
| 2,866,012 | Ginsburg | Dec. 23, 1958 |